United States Patent
Chu et al.

(10) Patent No.: US 8,706,948 B2
(45) Date of Patent: Apr. 22, 2014

(54) DATA WRITING METHOD FOR NON-VOLATILE MEMORY, AND CONTROLLER AND STORAGE SYSTEM USING THE SAME

(75) Inventors: Chien-Hua Chu, Hsinchu County (TW); Hong-Lipp Ko, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 144 days.

(21) Appl. No.: 13/477,813

(22) Filed: May 22, 2012

(65) Prior Publication Data

US 2012/0233388 A1     Sep. 13, 2012

Related U.S. Application Data

(62) Division of application No. 12/764,583, filed on Apr. 21, 2010, now Pat. No. 8,266,334.

(30) Foreign Application Priority Data

Feb. 12, 2010  (TW) ................................ 99104816 A

(51) Int. Cl.
  *G06F 3/00*  (2006.01)
  *G06F 13/00*  (2006.01)
  *G06F 3/06*  (2006.01)
(52) U.S. Cl.
  CPC .................................... *G06F 3/0601* (2013.01)
  USPC .......................................... 711/100; 710/36
(58) Field of Classification Search
  None
  See application file for complete search history.

(56) References Cited

U.S. PATENT DOCUMENTS

| | | | |
|---|---|---|---|
| 6,622,252 B1 | 9/2003 | Klaassen et al. | |
| 7,000,134 B2 | 2/2006 | Tsukihashi | |
| 8,266,334 B2 | 9/2012 | Chu et al. | |
| 2003/0023815 A1* | 1/2003 | Yoneyama et al. | ........... 711/133 |
| 2005/0240784 A1 | 10/2005 | Sugasawa | |

OTHER PUBLICATIONS

"Non-Final Office Action of Co-pending U.S. Appl. No. 13/034,686", issued on Mar. 4, 2013, p. 1-p. 14.

* cited by examiner

*Primary Examiner* — Alan Chen
(74) *Attorney, Agent, or Firm* — J.C. Patents

(57) ABSTRACT

A data writing method for writing data from a host system into a plurality of memory dies of a rewritable non-volatile memory storage apparatus is provided. The data writing method includes determining whether the data transmission interface of the host system complies with a first interface standard or a second interface standard. The data writing method also includes using a general mode to write the data into the memory dies when the data transmission interface of the host system complies with the first interface standard and using a power saving mode to write the data into the memory dies when the data transmission interface of the host system complies with the second interface standard. Accordingly, the data writing method can effectively prevent the stability of the rewritable non-volatile memory storage apparatus from reducing due to insufficient power supplied by the data transmission interface.

9 Claims, 8 Drawing Sheets

DATA WRITING METHOD FOR NON-VOLATILE MEMORY, AND CONTROLLER AND STORAGE SYSTEM USING THE SAME

CROSS-REFERENCE TO RELATED APPLICATION

This application is a divisional application of and claims the priority benefit of U.S. application Ser. No. 12/764,583, filed on Apr. 21, 2010, now pending, which claims the priority benefit of Taiwan application serial no. 99104816, filed on Feb. 12, 2010. The entirety of each of the above-mentioned patent applications is hereby incorporated by reference herein and made a part of specification.

BACKGROUND OF THE INVENTION

1. Technology Field

The present invention relates to a data writing method for a non-volatile memory, and a rewritable non-volatile memory controller and a rewritable non-volatile memory storage system using the same.

2. Description of Related Art

Along with the widespread of digital cameras, cell phones, and MP3 in recently years, the consumers' demand to storage media has increased drastically. Rewritable non-volatile memory is one of the most adaptable memories for such battery-powered portable products due to its characteristics such as data non-volatility, low power consumption, small volume, and non-mechanical structure. A flash drive is a storage apparatus adopting rewritable non-volatile memory as storage medium. Rewritable non-volatile memory has been broadly used for storing important personal data thanks to its small volume and large capacity. Therefore, the rewritable non-volatile memory industry has become a very important part of the electronic industry in recent years.

A memory die of a rewritable non-volatile memory storage apparatus has a plurality of physical blocks, and each physical block has a plurality of physical pages, wherein data must be written into a physical block according to the sequence of the physical pages in the physical block. In general, the procedure of writing data into a physical page may be divided into a data transfer portion and a data program portion. To be specific, when data is about to be stored into the physical page of the memory die, the control circuit of the rewritable non-volatile memory storage apparatus first transmits the data to the buffer of the memory die. Then, the memory die programs the data from the buffer into the physical page. During the control circuit of the rewritable non-volatile memory storage apparatus transmits the data to the buffer of the memory die, the memory die is at a transmission status. And, during the data is programmed into the physical page, the memory die is at a busy status.

In order to increase the writing speed of a rewritable non-volatile memory storage apparatus, a plurality of memory dies is disposed in the rewritable non-volatile memory storage apparatus and data is written in a interleave manner or a parallel manner. For example, taking a rewritable non-volatile memory storage apparatus having a first memory die and a second memory die, which coupled to a control circuit via one data input/output bus, as an example, when a host system is about to store a plurality of page data (i.e., data having the length that is larger than the capacity of one physical page) into the rewritable non-volatile memory storage apparatus, the control circuit may transmit one page data to the first memory die. After that, during the first memory die is at the busy status, the control circuit may transmit another page data to the second memory die. Then, during the second memory die is at the busy status, the control circuit may transmit another page data to the first memory die. Accordingly, the first and second memory dies are alternately received data from the control circuit and program the received data, thereby shortening the time for writing data.

In particular, when the memory die is at the transmission status or the busy status, the memory die needs power to transmitting data or programming data. However, in view of a flash drive operated with the power supplied by a data transmission interface of a host system, when several memory dies are enabled at the same time (i.e., several memory dies are at the transmission status and the busy status at the same time), the power supplied by the data transmission interface may be not enough, such that the stability of the rewritable non-volatile memory storage apparatus is reduced.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention relates to a data writing method for a rewritable non-volatile memory, which is capable of preventing the stability of the rewritable non-volatile memory storage apparatus from reducing due to the insufficient power supplied by a data transmission interface.

The present invention relates to a rewritable non-volatile memory controller executing a data writing method capable of preventing the stability of the rewritable non-volatile memory storage apparatus from reducing due to the insufficient power supplied by a data transmission interface.

The present invention relates to a rewritable non-volatile memory storage system executing a data writing method capable of preventing the stability of the rewritable non-volatile memory storage apparatus from reducing due to the insufficient power supplied by a data transmission interface.

According to an exemplary embodiment of the present invention, a data writing method for writing data from a host system into a plurality of memory dies of a rewritable non-volatile memory storage apparatus is provided, wherein a host interface of the rewritable non-volatile memory storage apparatus couples to a data transmission interface of the host system. The data writing method includes determining whether the data transmission interface of the host system complies with a first interface standard or a second interface standard. The data writing method also includes using a general mode to write the data into the memory dies when the data transmission interface of the host system complies with the first interface standard and using a power saving mode to write the data into the memory dies when the data transmission interface of the host system complies with the second interface standard. Herein, the number of the memory dies that are enabled at the same time is not larger than a first amount in the general mode, and the number of the memory dies that are enabled at the same time is not larger than a second amount in the power saving mode.

According to an exemplary embodiment of the present invention, a data writing method for writing data from a host system into a plurality of memory dies of a rewritable non-volatile memory storage apparatus is provided. The data writing method includes recording the number of the memory dies that are at a busy status and recording the number of the memory dies that are at a transmission status. The data writing method also includes determining whether the sum of the number of the memory dies that are at the busy status and the number of the memory dies that are at the transmission status is smaller than a predetermined threshold; and writing the data into one of the memory dies when the sum of the number of the memory dies that are at the busy status and the number of the memory dies that are at the transmission status is smaller than a predetermined threshold, wherein the memory die that the data is written into is not at the transmission status nor the busy status and the predetermined threshold is smaller than the total of the memory dies.

According to an exemplary embodiment of the present invention, a rewritable non-volatile memory controller including a host interface, a rewritable non-volatile memory interface and a memory management circuit is provided. The host interface is configured to couple to a host system. The rewritable non-volatile memory interface is configured for coupling to the above-mentioned memory dies. The memory management circuit couples to the host interface and the rewritable non-volatile memory interface, and configured for executing the above-mentioned data writing method.

A rewritable non-volatile memory storage system including a connector, a memory module having a plurality of memory dies and a rewritable non-volatile memory controller coupled to the memory module. Herein the rewritable non-volatile memory controller is configured for executing the above-mentioned data writing method.

Based on the above, in the exemplary embodiment of the present invention, the data writing method is capable of preventing the stability of the rewritable non-volatile memory storage apparatus from reducing due to the insufficient power during several memory dies are enabled for writing data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
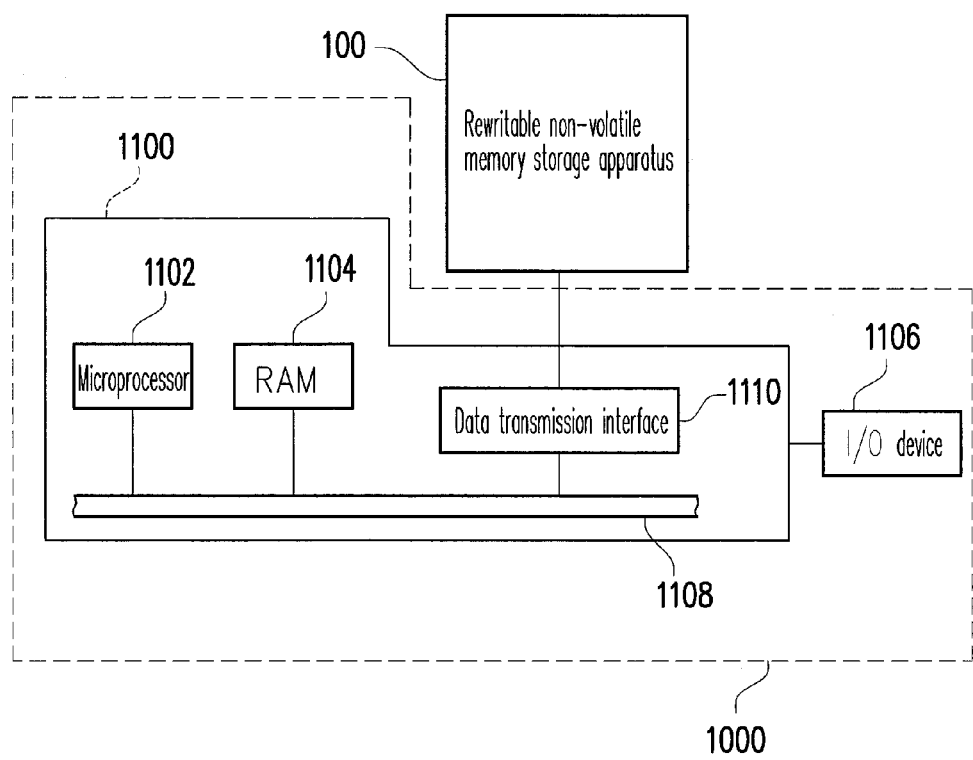
FIG. 1A is a schematic block diagram of a host system using a rewritable non-volatile memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A rewritable non-volatile memory storage apparatus (i.e., a rewritable non-volatile memory storage system), typically, includes a memory module and a controller (i.e., a control circuit). The rewritable non-volatile memory storage apparatus is usually used together with a host system so that the host system can write data into or read data from the rewritable non-volatile memory storage apparatus. In addition, a rewritable non-volatile memory storage apparatus also includes an embedded rewritable non-volatile memory and a software that can be executed by a host system and substantially served as a controller of the embedded rewritable non-volatile memory.

First Exemplary Embodiment

FIG. 1A is a schematic block diagram of a host system using a rewritable non-volatile memory storage apparatus according to a first exemplary embodiment of the present invention.

Figure 1B:
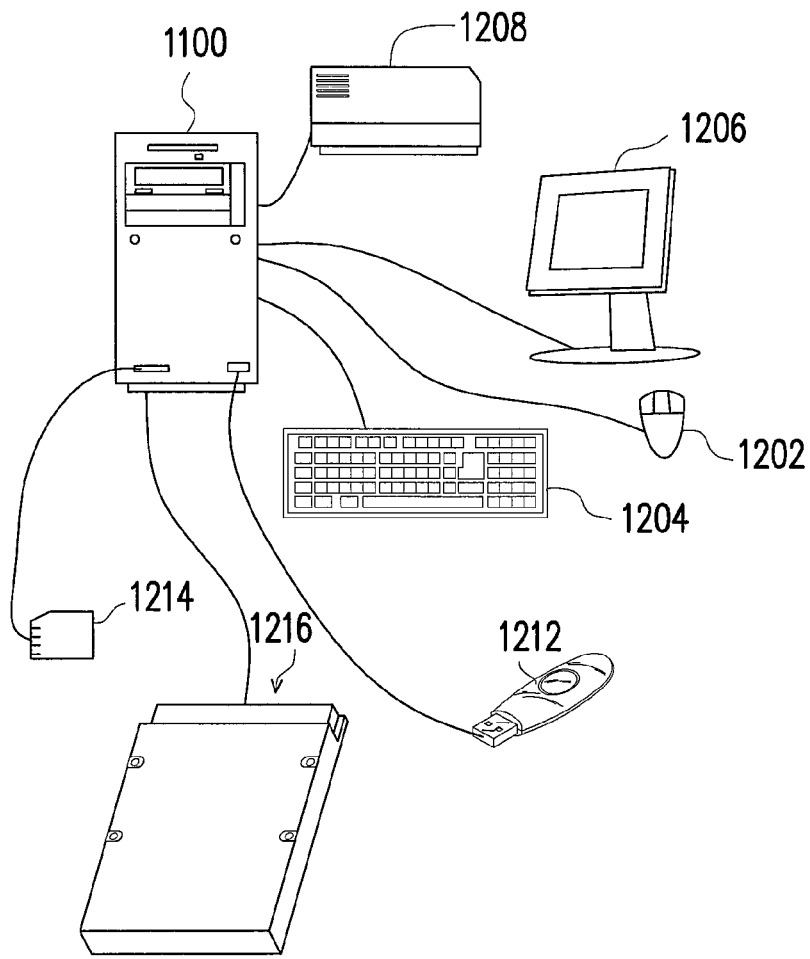
FIG. 1B is a diagram illustrating a computer, an input/output (I/O) device, and a rewritable non-volatile memory storage apparatus according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the exemplary embodiment of the present invention, the rewritable non-volatile memory storage apparatus 100 is coupled to the devices of the host system 1000 through the data transmission interface 1110. By using the microprocessor 1102, the random access memory (RAM) 1104 and the Input/Output (I/O) device 1106, the data can be write into the rewritable non-volatile memory storage apparatus 100 or can be read from the rewritable non-volatile memory storage apparatus 100. The rewritable non-volatile memory storage apparatus 100 may be a flash drive 1212, a memory card 1214, or a solid state drive (SSD) 1216, as shown in FIG. 1B.

Figure 1C:
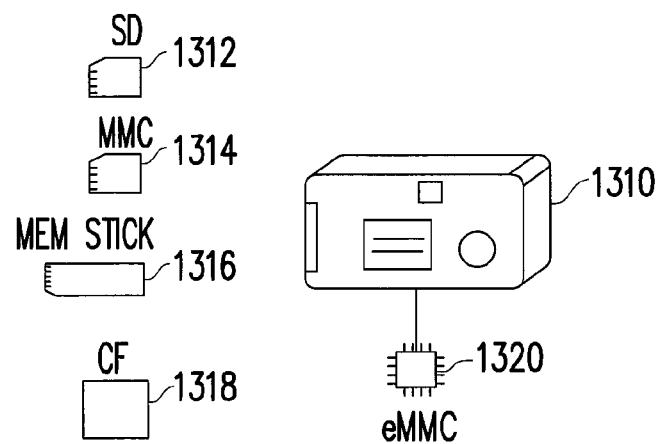
FIG. 1C is a diagram of a host system and a rewritable non-volatile memory storage apparatus according to another exemplary embodiment of the present invention.

Generally, the host system 1000 substantially can be any system capable of storing data. Even though the host system 1000 is described as a computer system in the exemplary embodiment, in another exemplary embodiment of the present invention, the host system 1000 may also be a digital camera, a video camera, a communication device, an audio player, or a video player, and etc. For example, if the host system is a digital camera (video camera) 1310, the rewritable non-volatile memory storage apparatus is then a SD card 1312, a MMC card 1314, a memory stick 1316, a CF card 1318 or an embedded storage device 1320 (as shown in FIG. 1C). The embedded storage device 1320 includes an embedded MMC (eMMC). It should be mentioned that the eMMC is directly coupled to a substrate of the host system 1000.

Figure 2:
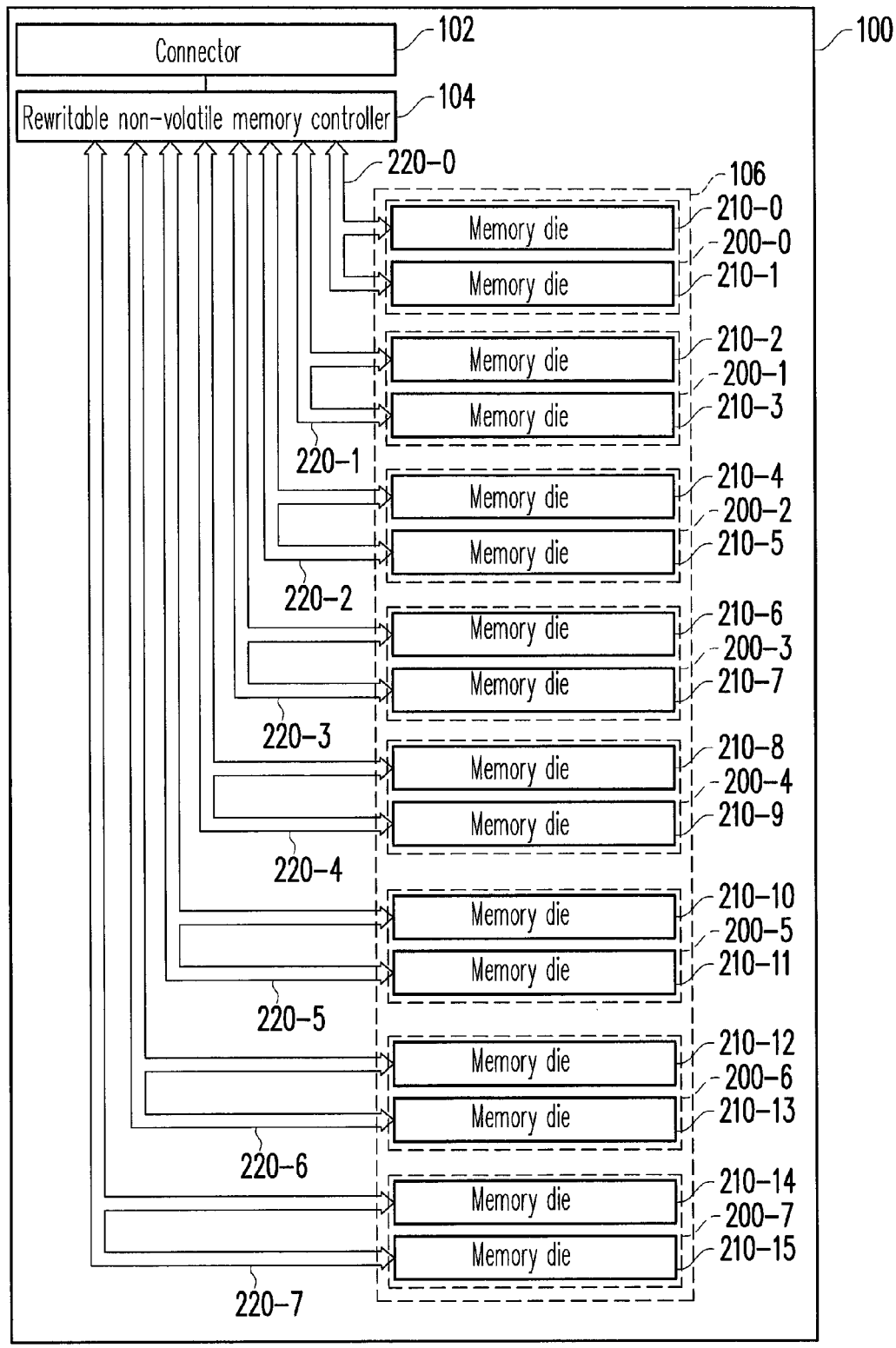
FIG. 2 is a schematic block diagram of the rewritable non-volatile memory storage apparatus in FIG. 1A.

FIG. 2 is a schematic block diagram of the rewritable non-volatile memory storage apparatus in FIG. 1A.

Referring to FIG. 2, the rewritable non-volatile memory storage apparatus 100 includes a connector 102, a rewritable non-volatile memory controller 104, and a memory module 106.

The connector 102 is coupled to the rewritable non-volatile memory controller 104 and configured for coupling to the host system 1000. In the present exemplary embodiment, the connector 102 is a Universal Serial Bus (USB) connector and complies with the USB 3.0 standard. Nevertheless, it should be understood that the present invention is not limited thereto, and the connector 102 may be other suitable connector.

The rewritable non-volatile memory controller 104 executes a plurality of logic gates or control instructions implemented in a hardware form or a firmware form and performs various data operations such as data writing, reading, and erasing in the memory module 106 according to commands from the host system 1000.

Figure 3:
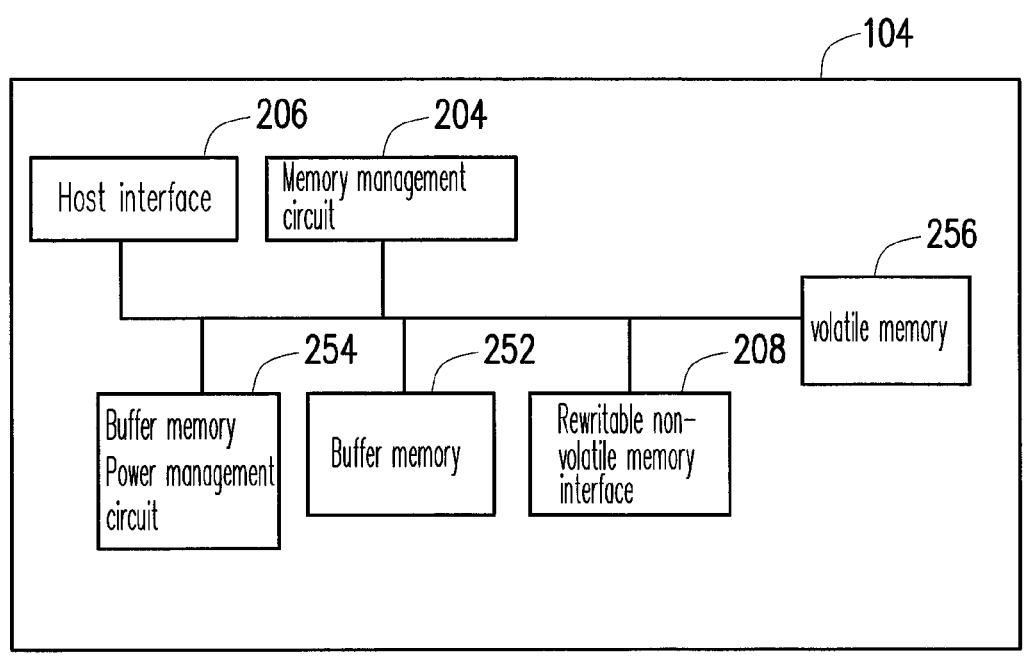
FIG. 3 is a schematic block diagram of a rewritable non-volatile memory controller according to the first exemplary embodiment of the present invention.

FIG. 3 is a schematic block diagram of a rewritable non-volatile memory controller according to the first exemplary embodiment of the present invention.

Referring FIG. 3, the rewritable non-volatile memory controller 104 includes a memory management circuit 204, a host interface 206 and a rewritable non-volatile memory interface 208.

The memory management circuit 204 is configured for controlling the whole operation of the rewritable non-volatile memory controller 104. To be specific, the memory management circuit 204 has a plurality of control instructions, and the control instructions are executed to manage the memory module 106 according to a data writing mechanism and a memory management mechanism of the present exemplary embodiment when the rewritable non-volatile memory storage apparatus is operated. The data writing mechanism and the memory management mechanism will be described with drawings in the following.

In the present exemplary embodiment, the control instructions of the memory management circuit 204 are implemented in a firmware form. For example, the memory management circuit 204 has a micro-processor unit (not shown) and a read-only memory (not shown), and the control instructions are burned in the read-only memory. When the rewritable non-volatile memory storage apparatus is operated, the control instructions are executed by the micro-processor unit to accomplish the data writing mechanism and the memory management mechanism according to the present exemplary embodiment.

In another exemplary embodiment of the present invention, the control instructions of the memory management circuit 204 are stored in a specific area (for example, the system area of a memory module exclusively used for storing system data) of the memory module 106 as program codes. Additionally, the memory management circuit 204 may have a micro-processor unit (not shown), a read-only memory (not shown) and a random access memory (not shown). And, the read-only memory has a driver code, and when the rewritable non-volatile memory controller is enabled, the micro-processor unit executes the driver code to load the control instructions of the memory management circuit 204 stored in the memory module 106 into the random access memory of the memory management circuit 204, and then accomplish the data writing mechanism and the memory management mechanism of the exemplary embodiment of the present invention based on the control instructions. Additionally, in another exemplary embodiment of the present invention, the control instructions of the memory management circuit 204 are also implemented in a hardware form.

The host interface 206 is coupled to the memory management circuit 204, and configured for receiving and identifying commands and data from the host system 1000. Namely, the commands and data from the host system 1000 are transmitted to the memory management circuit 204 through the host interface 206. In the present exemplary embodiment, the host interface 206 is a USB interface, complying with the USB 3.0 standard, corresponding to the connector 102. Nevertheless, it should be understood that the present invention is not limited thereto, and the host interface 206 may be other suitable data transmission interface.

The rewritable non-volatile memory interface 208 is coupled to the memory management circuit 204 and used for accessing the memory module 106. Namely, data to be written into the memory module 106 is converted by the rewritable non-volatile memory interface 208 into a format acceptable to the memory module 106.

In another exemplary embodiment of the present invention, the rewritable non-volatile memory controller 104 still includes a buffer memory 252. The buffer memory 252 is coupled to the memory management circuit 204 and configured to temporarily store data and commands from the host system 1000 or data from the memory module 106.

In another exemplary embodiment of the present invention, the rewritable non-volatile memory controller 104 still includes a power management circuit 254. The power management circuit 254 is coupled to the memory management circuit 204 and used for controlling the power of the rewritable non-volatile memory storage apparatus 100.

In another exemplary embodiment of the present invention, the rewritable non-volatile memory controller 104 still includes an error checking and correcting circuit 256. The error checking and correcting unit 256 is coupled to the memory management circuit 204, and configured for executing an error checking and correcting procedure to ensure data accuracy. To be specific, when the memory management circuit 204 receives a write command from the host system 1000, the error checking and correcting unit 256 generates an error checking and correcting (ECC) code for the data corresponding to the write command, and the memory management circuit 204 writes the data and the corresponding ECC code into the memory module 106. Subsequently, when the memory management circuit 204 reads the data from the memory module 106, the memory management circuit 204 simultaneously reads the corresponding ECC code, and the error checking and correcting unit 256 executes the ECC procedure for the read data based on the ECC code corresponding to the read data.

Referring to FIG. 2 again, the memory module 106 is coupled to the rewritable non-volatile memory controller 104 and used for storing data. Herein, the memory module 106 is a multi-level cell (MLC) NAND flash memory module. However, the present invention is not limited thereto, and the memory module 106 may also be a single level cell (SLC) NAND flash memory module.

In the present exemplary embodiment, the memory module 106 has memory unit 200-0~200-7. In the present exemplary embodiment, the memory unit 200-0 has memory dies 210-0 and 210-1, the memory unit 200-1 has memory dies 210-2 and 210-3, the memory unit 200-2 has memory dies 210-4 and 210-5, the memory unit 200-3 has memory dies 210-6 and 210-7, the memory unit 200-4 has memory dies 210-8 and 210-9, the memory unit 200-5 has memory dies 210-10 and 210-11, the memory unit 200-6 has memory dies 210-12 and 210-13, and the memory unit 200-7 has memory dies 210-14 and 210-15.

The memory dies 210-0~210-15 respectively have a plurality of physical blocks (not shown) for storing data. In the memory module 106, a smallest unit for erasing data is one physical block. That is to say, each physical block contains the least number of memory cells that are erased together. Each physical block has several physical pages, and a smallest unit for programming data is one physical page. In other words, each physical page is the smallest unit for writing data or reading data. Each physical page usually includes a user data bit area and a redundant bit area. The user data bit area is used for storing user data, and the redundant bit area is used for storing system data (for example, the ECC code).

In the present exemplary embodiment, the rewritable non-volatile memory interface 208 of the rewritable non-volatile memory controller 104 transmits data to or receive data from the memory unit 200-0~200-7 through data input/output bus 220-0~220-7, respectively. To be specific, the rewritable non-volatile memory controller 104 transmits data to the memory dies 210-0 and 210-1 through the data input/output bus 220-0. The rewritable non-volatile memory controller 104 transmits data to the memory dies 210-2 and 210-3 through the data input/output bus 220-1. The rewritable non-volatile memory controller 104 transmits data to the memory dies 210-4 and 210-5 through the data input/output bus 220-2. The rewritable non-volatile memory controller 104 transmits data to the memory dies 210-6 and 210-7 through the data input/output bus 220-3. The rewritable non-volatile memory controller 104 transmits data to the memory dies 210-8 and 210-9 through the data input/output bus 220-4. The rewritable non-volatile memory controller 104 transmits data to the memory dies 210-10 and 210-11 through the data input/output bus 220-5. The rewritable non-volatile memory controller 104 transmits data to the memory dies 210-12 and 210-13 through the data input/output bus 220-6. And, the rewritable non-volatile memory controller 104 transmits data to the memory dies 210-14 and 210-15 through the data input/output bus 220-7.

In the present exemplary embodiment, the memory management circuit 204 groups the physical blocks of the memory dies 210-0~210-15 into a plurality of physical units and manages the memory dies 210-0~210-15 in unit of each physical unit. In particular, each of the physical units is composed of several physical blocks and the physical blocks respectively belong to different memory dies. Therefore, the memory management circuit 204 may use a parallel mode and a interleave mode to increase the speed for writing data.

To be specific, because each memory module is coupled to the rewritable non-volatile memory controller 104 by an individual data input/output bus, in the parallel mode, the memory management circuit 204 simultaneously transmits a plurality of data to several memory modules through several data input/output buses to increase the speed of accessing data. That is, when writing data into one physical unit, because the physical unit is composed of physical blocks belonging to different memory modules, the memory management circuit 204 simultaneously transmits and writes data corresponding to the physical pages of different physical block through several data input/output buses in the parallel mode.

Moreover, because each memory unit includes two memory dies, in the interleave mode, the memory management circuit 204 alternately uses the corresponding data input/output bus to transmit data to the two memory dies in the same memory module, thereby increasing the speed of accessing data. To be specific, as described above, the procedure of writing data into a memory die may be divided into a data transfer portion and a data program portion. Herein, the interleave mode means that in a case where two memory dies receive data through the same data input/output bus, data is transmitted to one of the memory dies during another data is programmed into the other memory die.

It should be mentioned that in the present exemplary embodiment, the memory management circuit 204 determines whether the number of memory dies that are enabled at the same time should be limited within a predetermined threshold according to the power supplied by the data transmission interface 1110. To be specific, the rewritable non-volatile memory storage apparatus 100 is operated with the power supplied by the data transmission interface 1110 of the host system 1000. Therefore, the number of memory dies that can be enabled at the same time is varied according to different data transmission interface in the rewritable non-volatile memory storage apparatus 100.

For example, in a case where the data transmission interface 1110 complies with the USB 3.0 standard, the data transmission interface 1110 may supply the power having 900 milliamperes(mA). Therefore, in the present exemplary embodiment, the memory management circuit 204 writes data without limiting the number of memory dies that can be enabled at the same time. Herein, the writing without limiting the number of memory dies that can be enabled at the same time is referred as "a general mode".

For example, in a case where the data transmission interface 1110 complies with the USB 2.0 standard, the data transmission interface 1110 may only supply the power having 500 milliamperes(mA). Therefore, the memory management circuit 204 sets the predetermined threshold to 12 for limiting that the number of memory dies that can be enabled at the same time is not larger than 12. That is, the predetermined threshold is set according to the type of the data transmission interface 1110. For example, the memory management circuit 204 receives a detection signal from the host interface 206 to identify the type of the data transmission interface 1110 and thereby set the predetermined threshold. Or, in another exemplary embodiment, the memory management circuit 204 may detect the transmission speed between the host interface 206 and the data transmission interface to identify the type of the data transmission interface 1110 and thereby set the predetermined threshold. For example, the memory management circuit 204 includes a timer (not shown) and measures whether the quantity of data read by the host system 1000 from the buffer memory 252 is larger than the quantity of data read by the memory management circuit 204 from the memory module 106 during a period counted by the timer, thereby calculating the speed of receiving data by the host system 1000 and the speed of transmitting data by the memory module 106. And, the type of the data transmission interface can be identified by determining whether the speed of receiving data by the host system 1000 is closed to or larger than the speed of transmitting data by the memory module 106. For example, in the present exemplary embodiment, the memory units of the memory module 106 transmit data through eight data input/output buses. The transmission speed of each data input/output bus is 320 megabits per second, and therefore the read speed of the memory module 106 is 2560 megabits per second. Because the speed of the USB 2.0 standard is 480 megabits per second and the speed of the USB 3.0 standard is 5000 megabits per second, the data transmission interface 1110 of the host system 1000 should complies with the USB 3.0 standard if the speed of reading data by the host system 1000 is closed to or larger than 2560 megabits per second.

Herein, the writing with limiting the number of memory dies that can be enabled at the same time is referred as "a power saving mode".

In the present exemplary embodiment, the memory management circuit 204 records which memory dies are at the busy status and which memory dies are at the transmission status. For example, the memory management circuit 204 identifies an idle-busy signal to determine whether a memory die is at the busy status indicating that data is programming into the memory die or an idle status indicating that no data is programming into the memory die. Additionally, the memory management circuit 204 identifies a standby-transmission signal to determine whether a memory die is at the transmission status indicating that data is transmitting into the memory die or a standby status indicating that no data is transmitting into the memory die.

Moreover, in the present exemplary embodiment, the memory management circuit 204 establishes and maintains a busy status list and a transmission status list to record information obtained from the idle-busy signals and the standby-transmission signals. That is, when a memory die starts to be at the busy status, the memory management circuit 204 records the serial number of the memory die in the busy status list, and when the memory die has finished the data program (i.e., the memory die is at the idle status), the memory management circuit 204 deletes the serial number of the memory die from the busy status list. Similarly, when a memory die starts to be at the transmission status, the memory management circuit 204 records the serial number of the memory die in the transmission status list, and when the memory die has finished the data transfer (i.e., the memory die is at the standby status), the memory management circuit 204 deletes the serial number of the memory die from the transmission status list.

Figure 4:
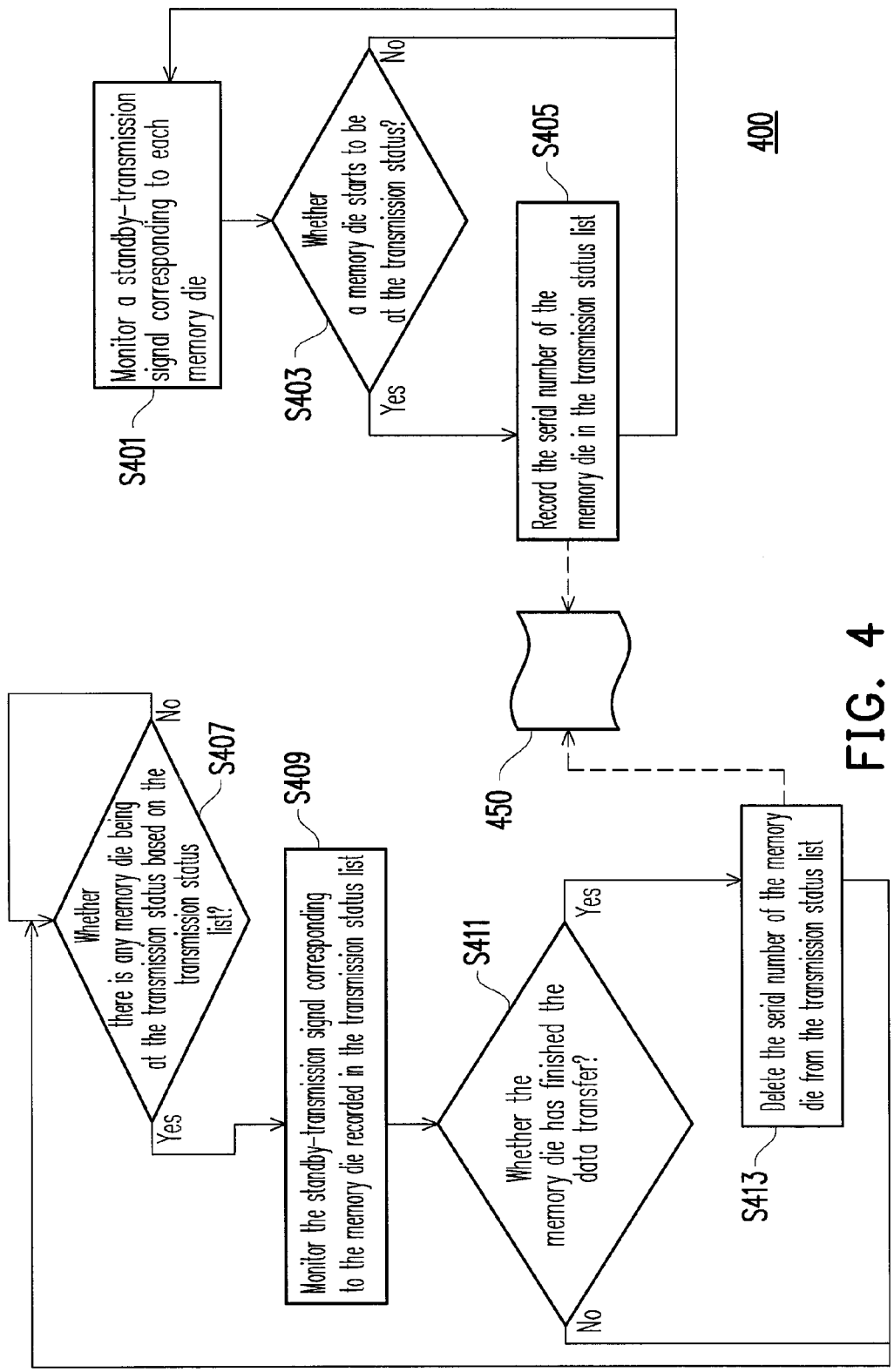
FIG. 4 is a flowchart of recording the memory die that is at a transmission status according to the first exemplary embodiment of the present invention.

FIG. 4 is a flowchart of recording the memory die that is at the transmission status according to the first exemplary embodiment of the present invention.

Referring to FIG. 4, a procedure 400 includes an adding task for the transmission status list, which is composed of steps S401, S403 and S405, and a deleting task for the transmission status list, which is composed of steps S407, S409, S411 and S413. The adding task for the transmission status list and the deleting task for the transmission status list are started and executed by the memory management circuit 204 at a suitable time.

In the adding task for the transmission status list, first, in step S401, the memory management circuit 204 monitors the standby-transmission signal corresponding to each memory die, and in step S403, the memory management circuit 204 determines whether a memory die starts to be at the transmission status. When a memory die starts to be at the transmission status, in step S405, the memory management circuit 204 records the serial number of the memory die in the transmission status list 450.

In the deleting task for the transmission status list, first, in step S407, the memory management circuit 204 determines whether there is any memory die being at the transmission status based on the transmission status list 450. When there is a memory die being at the transmission status, in step S409, the memory management circuit 204 monitors the standby-transmission signal corresponding to the memory die recorded in the transmission status list 450, and in step S411, the memory management circuit 204 determines whether the memory die has finished the data transfer. For example, the memory management circuit 204 uses an interrupt manner or a polling manner to obtain the standby-transmission signal corresponding to each memory die. When the memory die is at the standby status (i.e., the memory die has finished the data transfer), in step S413, the memory management circuit 204 deletes the serial number of the memory die from the transmission status list 450.

Figure 5:
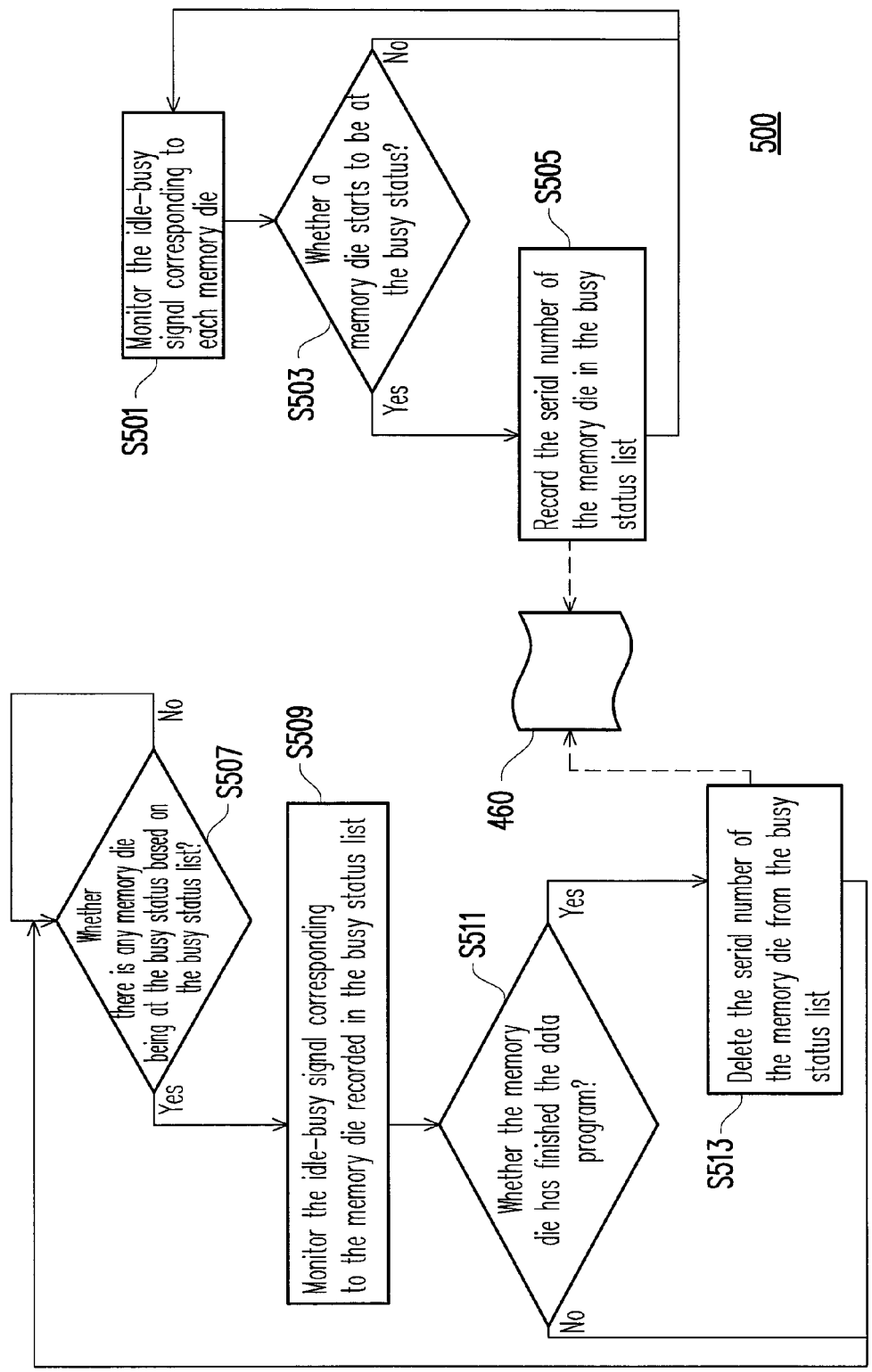
FIG. 5 is a flowchart of recording the memory die that is at a busy status according to the first exemplary embodiment of the present invention.

FIG. 5 is a flowchart of recording the memory die that is at the busy status according to the first exemplary embodiment of the present invention.

Referring to FIG. 5, a procedure 500 includes an adding task for the busy status list, which is composed of steps S501, S503 and S505, and a deleting task for the busy status list, which is composed of steps S507, S509, S511 and S513. The adding task for the busy status list and the deleting task for the busy status list are started and executed by the memory management circuit 204 at a suitable time.

In the adding task for the busy status list, first, in step S501, the memory management circuit 204 monitors the idle-busy signal corresponding to each memory die, and in step S503, the memory management circuit 204 determines whether a memory die starts to be at the busy status. When a memory die starts to be at the busy status, in step S505, the memory management circuit 204 records the serial number of the memory die in the busy status list 460.

In the deleting task for the busy status list, first, in step S507, the memory management circuit 204 determines whether there is any memory die being at the busy status based on the busy status list 460. When there is a memory die being at the busy status, in step S509, the memory management circuit 204 monitors the idle-busy signal corresponding to the memory die recorded in the busy status list 460, and in step S511, the memory management circuit 204 determines whether the memory die has finished the data program. For example, the memory management circuit 204 uses an interrupt manner or a polling manner to obtain the idle-busy signal corresponding to each memory die. When the memory die is at the idle status (i.e., the memory die has finished the data program), in step S513, the memory management circuit 204 deletes the serial number of the memory die from the busy status list 460.

In the power saving mode, whenever the rewritable nonvolatile memory controller 104 is about to write data written by the host system 1000 into a memory die of the memory module 106, the memory management circuit 204 calculates the number of memory dies that currently are enabled (i.e., at the busy status and the transmission status) based on the busy status list 460 and the transmission status list 450. In particular, the memory management circuit 204 writes the data into the corresponding memory die only when the number of memory dies that currently are enabled in the memory module 106 is smaller than the predetermined threshold. On the contrary, when the number of memory dies that currently are enabled in the memory module 106 is not smaller than the predetermined threshold, the memory management circuit 204 waits and continuously monitors the idle-busy signals and the standby-transmission signals corresponding the memory dies that are enabled (as the procedures shown in FIG. 4 and FIG. 5).

Figure 6:
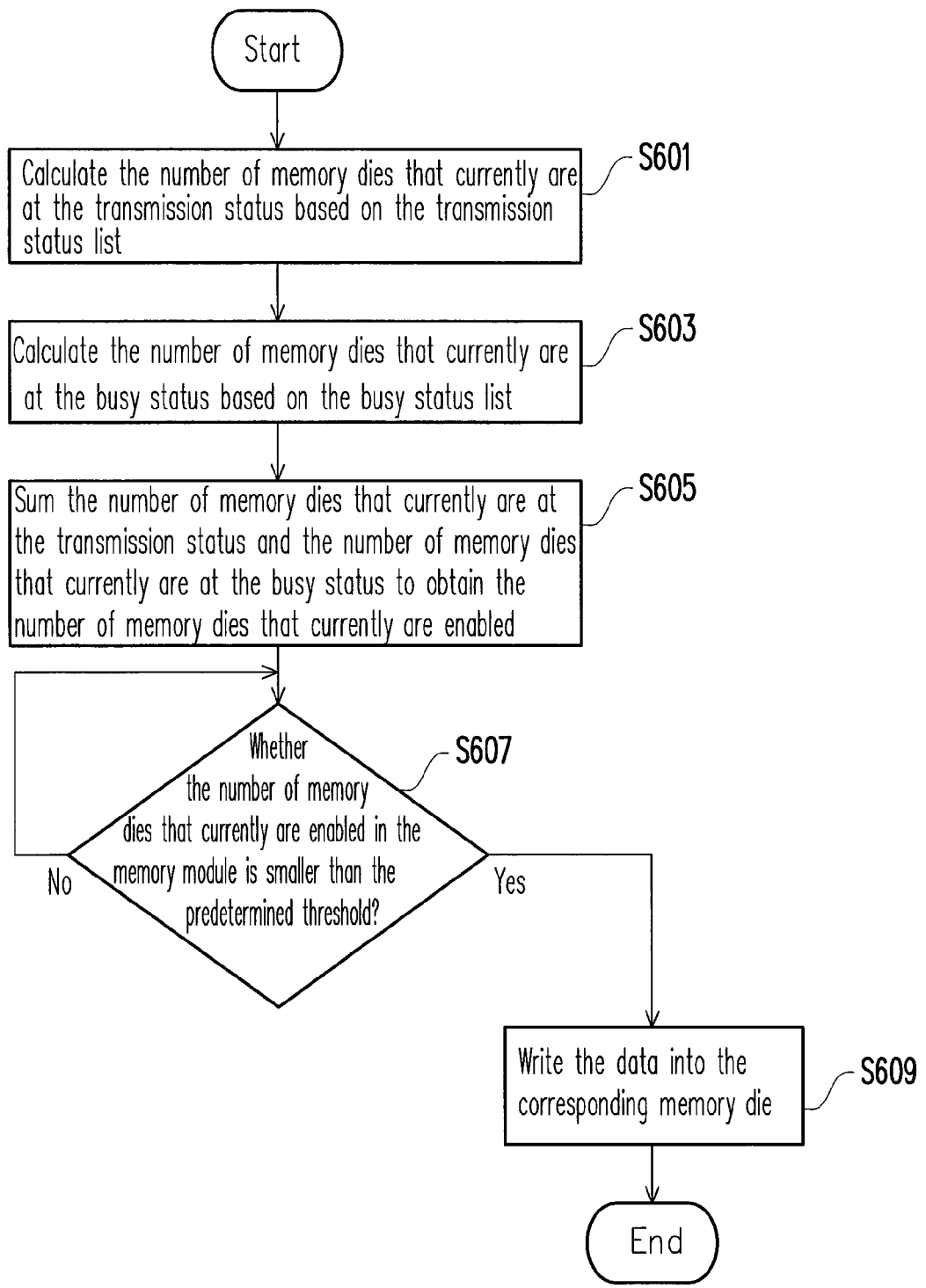
FIG. 6 is a flowchart of writing data in a power saving mode according to the first exemplary embodiment of the present invention.

FIG. 6 is a flowchart of writing data in the power saving mode according to the first exemplary embodiment of the present invention.

Referring to FIG. 6, when the rewritable non-volatile memory controller 104 is about to write data written by the host system 1000 into a memory die of the memory module 106, in step S601, the memory management circuit 204 calculates the number of memory dies that currently are at the transmission status based on the transmission status list 450, and in step S603, the memory management circuit 204 calculates the number of memory dies that currently are at the busy status based on the busy status list 460.

Then, in step S605, the memory management circuit 204 sums the number of memory dies that currently are at the transmission status and the number of memory dies that currently are at the busy status to obtain the number of memory dies that currently are enabled.

After that, in step S607, memory management circuit 204 determines whether the number of memory dies that currently are enabled in the memory module 106 is smaller than the predetermined threshold. If the number of memory dies that currently are enabled in the memory module 106 is smaller than the predetermined threshold, in step S609, the memory management circuit 204 writes the data into the corresponding memory die. If the number of memory dies that currently are enabled in the memory module 106 is not smaller than the predetermined threshold, then step S607 is executed.

Second Exemplary Embodiment

A rewritable non-volatile memory storage apparatus and a host system of the second exemplary embodiment substantially is the same as the rewritable non-volatile memory storage apparatus and the host system of the first exemplary embodiment. Herein, only the difference of the second exemplary embodiment will be described with FIG. 1A, FIG. 2 and FIG. 3.

Similar to the first exemplary embodiment, the control instructions of the memory management circuit 204 are executed by the micro-processor unit to accomplish the data writing mechanism and the memory management mechanism according to the second exemplary embodiment. The difference between the first exemplary embodiment and the second exemplary embodiment is that the memory management circuit 204 determines whether data can be written immediately according to the number of memory dies that currently are enabled in the power saving mode in the first exemplary embodiment. However, in the second exemplary embodiment, the memory management circuit 204 closes the interleave mode to limit the number of memory dies that are enabled at the same time in the power saving mode.

To be specific, the memory management circuit 204 receives a detection signal from the host interface 206 to identify the type of the data transmission interface 1110. In particular, when the data transmission interface 1110 belongs a kind of a transmission interface that only can supply lower power (e.g., USB 2.0), the rewritable non-volatile memory controller does not use the interleave mode to write data into the memory module 106, thereby avoiding that the power consumption of the rewritable non-volatile memory storage apparatus 100 exceeds the power supplied by the data transmission interface 1110. For example, in the present exemplary embodiment, when the memory management circuit 204 only uses the parallel mode to write data, the number of memory dies that are enabled at the same time is limited within 8.

Figure 7:
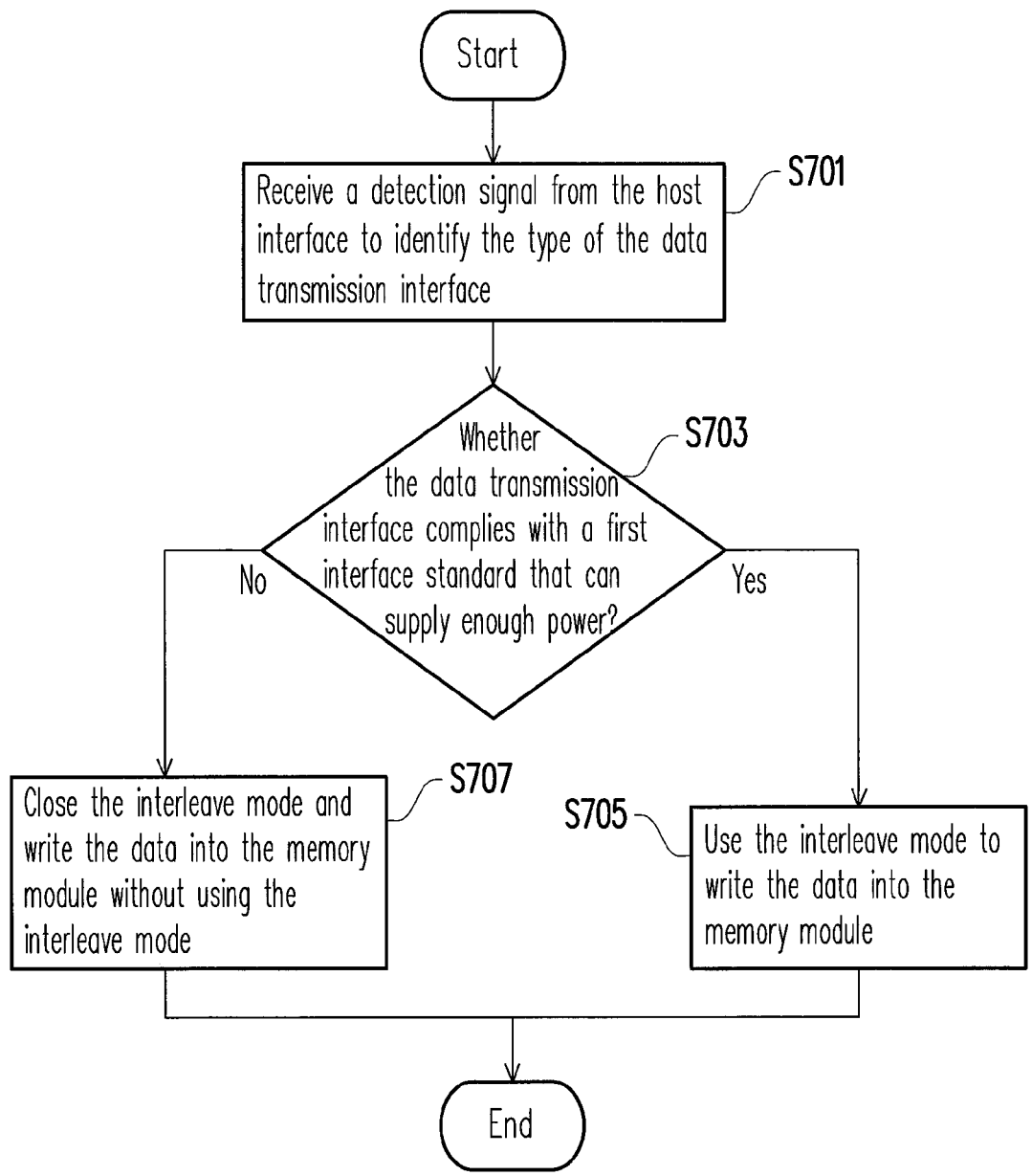
FIG. 7 is a flowchart of writing data according to the second exemplary embodiment of the present invention.

FIG. 7 is a flowchart of writing data according to the second exemplary embodiment of the present invention.

Referring to FIG. 7, when the rewritable non-volatile memory controller 104 is about to write data written by the host system 1000 into a memory die of the memory module 106, in step S701, the memory management circuit 204 receives a detection signal from the host interface 206 to identify the type of the data transmission interface 1110.

After that, in step S703, memory management circuit 204 determines whether the data transmission interface 1110 complies with a first interface standard that can supply enough power (e.g., USB 3.0).

If the data transmission interface 1110 complies with the first interface standard that can supply enough power, in step S705, memory management circuit 204 uses the interleave mode to write the data into the memory module 106.

If the data transmission interface 1110 does not comply with the first interface standard that can supply enough power (i.e., the data transmission interface 1110 complies with a second interface standard that can not supply enough power (e.g., USB 2.0)), in step S707, memory management circuit 204 closes the interleave mode and does not use the interleave mode to write the data into the memory module 106.

In summary, the data writing method according to the exemplary embodiments of the present invention uses the general mode or the power saving mode to write data based on the type of the data transmission interface of the host system. Accordingly, the number of memory dies that are enabled at the same time can be limited when the data transmission interface can not supply enough power, and thereby the above-mentioned stability issue due to the insufficient power can be prevented when the parallel mode and the interleave mode may be used for writing data. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method, for writing data from a host system into a plurality of memory dies of a rewritable non-volatile memory apparatus, the data writing method comprising:

recording the number of memory dies that are at a busy status among the memory dies;

recording the number of memory dies that are at a transmission status among the memory dies;

determining whether a sum of the number of memory dies that are at the busy status and the number of memory dies that are at the transmission status is smaller than a predetermined threshold; and writing the data into one of the memory dies when the sum is smaller than the predetermined threshold, the memory die written with the data is not at the busy status nor the transmission status, wherein the predetermined threshold is smaller than a total of the memory dies.

2. The data writing method according to claim 1 further comprising:

wherein the step of recording the number of memory dies that are at the busy status among the memory dies comprises:

monitoring an idle-busy signal corresponding to each of the memory dies;

adding a first memory die among the memory dies in a busy status list when the idle-busy signal corresponding to the first memory die becomes the busy status from an idle status;

deleting the first memory die from the busy status list when the idle-busy signal corresponding to the first memory die becomes the idle status from the busy status; and calculating the number of memory dies that are at the busy status among the memory dies according to the busy status list, wherein the step of recording the number of memory dies that are at the transmission status among the memory dies comprises:

monitoring a standby-transmission signal corresponding to each of the memory dies;

adding a second memory die among the memory dies in a transmission status list when the standby-transmission signal corresponding to the second memory die becomes the transmission status from a standby status;

deleting the second memory die from the transmission status list when the standby-transmission signal corresponding to the second memory die becomes the standby status from the transmission status; and calculating the number of memory dies that are at the transmission status among the memory dies according to the transmission status list.

3. The data writing method according to claim 1 further comprising:

detecting a transmission speed between the rewritable non-volatile memory storage apparatus and the host system; and setting the predetermined threshold according to the transmission speed.

4. A rewritable non-volatile memory controller, for writing data from a host system into a plurality of memory dies of a rewritable non-volatile memory apparatus, the rewritable non-volatile memory controller comprising:

a host interface, configured to couple to a data transmission interface of the host system;

a rewritable non-volatile memory interface, configured to couple to the memory dies; and a memory management circuit, coupled to the host interface and the rewritable non-volatile memory interface, wherein memory management circuit is configured to:

record the number of memory dies that are at a busy status among the memory dies;

record the number of memory dies that are at a transmission status among the memory dies;

determine whether a sum of the number of memory dies that are at the busy status and the number of memory dies that are at the transmission status is smaller than a predetermined threshold; and write the data into one of the memory dies when the sum is smaller than the predetermined threshold, the memory die written with the data is not at the busy status nor the transmission status, wherein the predetermined threshold is smaller than a total of the memory dies.

5. The rewritable non-volatile memory controller according to claim 4, wherein the memory management circuit is further configured to:

monitor an idle-busy signal corresponding to each of the memory dies;

add a first memory die among the memory dies in a busy status list when the idle-busy signal corresponding to the first memory die becomes the busy status from an idle status;

delete the first memory die from the busy status list when the idle-busy signal corresponding to the first memory dies becomes the idle status from the busy status;

calculate the number of memory dies that are at the busy status among the memory dies according to the busy status list, monitor a standby-transmission signal corresponding to each of the memory dies;

add a second memory die among the memory dies in a transmission status list when the standby-transmission signal corresponding to the second memory die becomes the transmission status from a standby status;

delete the second memory die from the transmission status list when the standby-transmission signal corresponding to the second memory die becomes the standby status from the transmission status; and calculate the number of memory dies that are at the transmission status among the memory dies according to the transmission status list.

6. The rewritable non-volatile memory controller according to claim 4, wherein the memory management circuit is further configured to:

detect a transmission speed between the rewritable non-volatile memory storage apparatus and the host system; and set the predetermined threshold according to the transmission speed.

7. A rewritable non-volatile memory storage system, comprising:

a connector, configured to couple to a host system;

a memory module, having a plurality of memory dies; and a rewritable non-volatile memory controller, coupled to the memory module and the connector and configured to:

receive data from the host system;

record the number of memory dies that are at a busy status among the memory dies;

record the number of memory dies that are at a transmission status among the memory dies;

determine whether a sum of the number of memory dies that are at the busy status and the number of memory dies that are at the transmission status is smaller than a predetermined threshold; and write the data into one of the memory dies when the sum is smaller than the predetermined threshold, the memory die written with the data is not at the busy status nor the transmission status, wherein the predetermined threshold is smaller than a total of the memory dies.

8. The rewritable non-volatile memory storage system according to claim 7, wherein the rewritable non-volatile memory controller is further configured to:

monitor an idle-busy signal corresponding to each of the memory dies;
add a first memory die among the memory dies in a busy status list when the idle-busy signal corresponding to the first memory die becomes the busy status from an idle status;
delete the first memory die from the busy status list when the idle-busy signal corresponding to the first memory die becomes the idle status from the busy status;
calculate the number of memory dies that are at the busy status among the memory dies according to the busy status list;
monitor a standby-transmission signal corresponding to each of the memory dies;
add a second memory die among the memory dies in a transmission status list when the standby-transmission signal corresponding to the second memory die becomes the transmission status from a standby status;
delete the second memory die from the transmission status list when the standby-transmission signal corresponding to the second memory die becomes the standby status from the transmission status; and
calculate the number of memory dies that are at the transmission status among the memory dies according to the transmission status list.

9. The rewritable non-volatile memory storage system according to claim 7, wherein the rewritable non-volatile memory controller is further configured to:
detect a transmission speed between the rewritable non-volatile memory storage apparatus and the host system; and
set the predetermined threshold according to the transmission speed.

* * * * *